T. E. MURRAY.
ELECTRIC WELDING APPARATUS.
APPLICATION FILED JAN. 29, 1917.

1,223,092.

Patented Apr. 17, 1917.
2 SHEETS—SHEET 1.

INVENTOR
Thomas E. Murray
BY
HIS ATTORNEY

UNITED STATES PATENT OFFICE.

THOMAS E. MURRAY, OF NEW YORK, N. Y.

ELECTRIC WELDING APPARATUS.

1,223,092.  Specification of Letters Patent.  Patented Apr. 17, 1917.

Application filed January 29, 1917. Serial No. 145,112.

*To all whom it may concern:*

Be it known that I, THOMAS E. MURRAY, a citizen of the United States, residing at New York, in the county of New York and State of New York, have invented a certain new and useful Improvement in Electric Welding Apparatus, of which the following is a specification.

The invention relates to electric welding apparatus, and consists in a welding electrode made in sections—there being conjointly in said sections, which are secured together, a matrix for receiving and positioning one of the objects to be welded; also in the construction of said sections, so that each may be readily removed and a new section substituted to provide for wear or injury; and also in the means for mechanically moving the welded objects out of the matrix in the lower electrode.

In the accompanying drawings—

Figure 1:
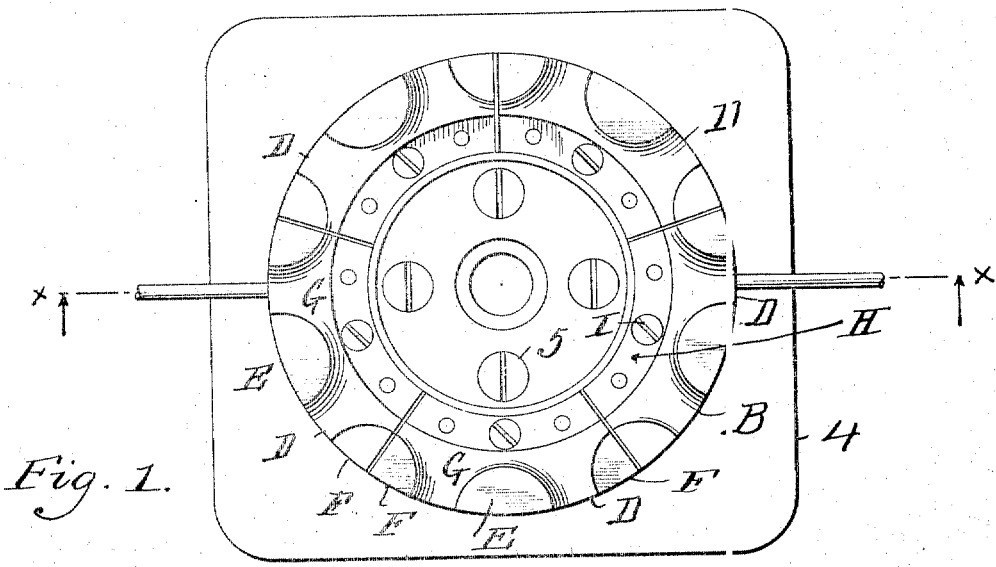
Figure 2:
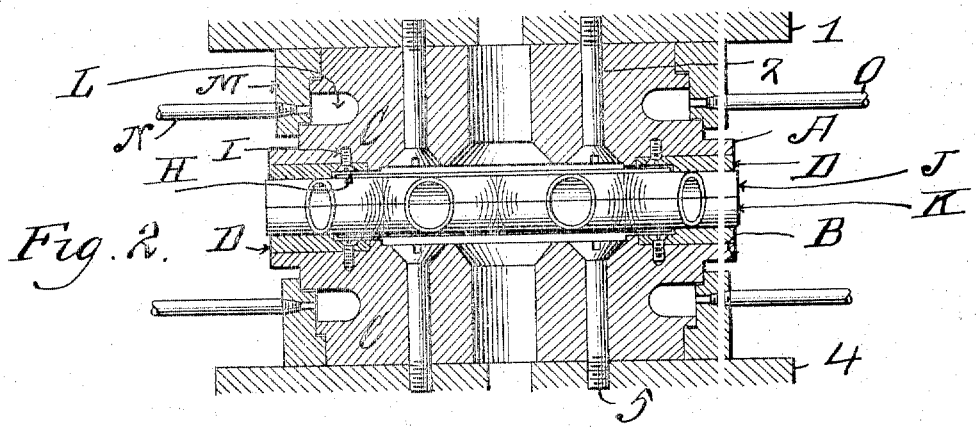
Figure 3:
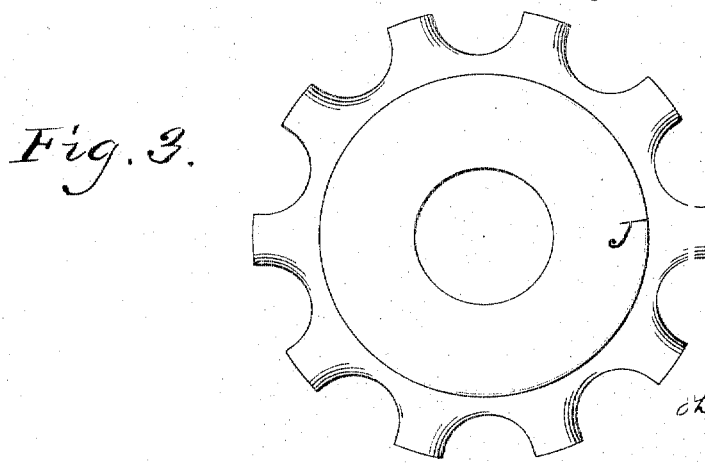
Figures 4, 5, 6:
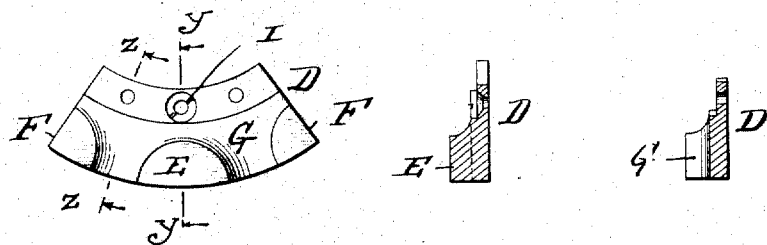
Figure 7:
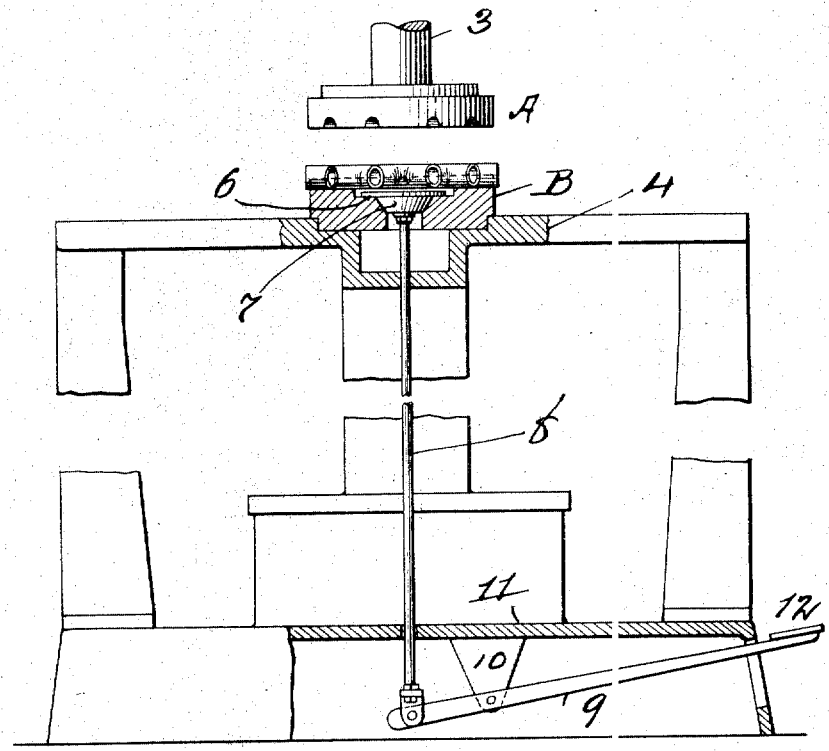

Figure 1 is a top view of the lower electrode. Fig. 2 is a section through both electrodes on the line $x, x$ of Fig. 1, the welded hub being shown in place. Fig. 3 is a face view of said hub. Fig. 4 is a plan view of one of the segmental protecting plates. Fig. 5 is a section on the line $y, y$ and Fig. 6 is a section on the line $z, z$ of Fig. 4. Fig. 7 shows in section the device for removing the welded hub from the lower electrode.

Similar letters and numbers of reference indicate like parts.

A represents generally the upper and B the lower electrode. Said electrodes are alike, so that a description of one applies to both. The electrode A is secured upon a plate 1 by the screws 2, and said plate may be carried by a rod 3, Fig. 7, which is moved vertically by any suitable means, so as to bring the electrode A down upon the parts of the hub to be welded. The electrode B is fixed, and may be secured upon the table 4 by screws 5.

Each electrode A or B is formed of an annular conducting support C, preferably of brass or copper, having in its exposed face a recess, in which is seated a plurality of circular segments D, Fig. 4. The exposed face of each segment exhibits a substantially semi-circular projection E, having on each side a quadrantal projection F, the groove or channel G between said projections being curved at its junction with said projections, and extending radially inward to a shallow recess H. A screw I extending through the metal of the segment at this recess fastens the segment to the support C. When all of the segments D are secured upon the support C, the several quadrantal projections F meeting one another form semi-circular projections similar to projections E, so that considering the surface of the electrode as a whole, the circular segmental plates D conjointly form a matrix adapted to receive and position the upper half J or lower half K, as the case may be, of the hub shown in Fig. 3. This hub is formed by stamping, pressing or striking up the dished shaped half sections J, K from sheet metal. When the lower half section K is placed on electrode B, the upper half section J is placed above half section K, so that their edges register and are in contact. When electrode A is moved downwardly, upper half section J enters the matrix in said electrode, and the two half sections are pressed together while the welding current is established through said electrodes A, B and said half hub sections J, K. Said half sections then become welded together at their edges, and so form the complete hollow hub.

In order to vary the temperature of each electrode due to the passage of the welding current—as, for example, to cool said electrode—I may provide in its outer cylindrical surface a groove L, and seat the electrode in a fixed ring M having diametrically opposite transverse ducts, in which respectively are screwed an inlet pipe N and an outlet pipe O, through which a cooling liquid—such as water—may be caused to circulate through said groove.

The circular segments D are all alike, and may be produced by stamping, striking up or pressing the metal. Each is separately attached to the support C, so that in case of injury, any segment may be removed without disturbing the others, and a new one substituted.

It is to be observed that by reason of the matrices formed in them, these electrodes also serve the function of dies, and by reason of the pressure exerted upon the objects between them, they force said objects to conform precisely to the shape of said matrices, thus correcting any warping or deformation in said objects which may be present or have occurred after their initial pressing, stamping or striking up. It is sometimes desirable to subject these objects not only to pressure, but at the same time to heat, in order to cause them more readily to conform to the matrices. In such case, the desired temperature may be obtained by allowing the welding current to heat the electrodes, in which event the grooves L may be empty, and no flow of liquid maintained through them.

The circulation of a cooling liquid through the groove in electrode A or electrode B here illustrates one means of varying the temperature of either electrode, or both electrodes, due to the passage of the welding current. In this way, I can regulate said temperature with respect to the material or dimensions of the welded objects, or either of them.

Where the hub has been forcibly pressed into the matrix of the lower electrode, and especially when subjected also to heat, as just described, it may stick in said matrix, requiring the use of some hand instrument to disengage it. To provide conveniently for this, I provide the device shown in Fig. 7. The lower electrode B has a central recess to receive a circular plate 6 which is carried by a frusto-conical circular block 7 which is seated in a correspondingly formed recess, also in said electrode. A rod 8 which supports block 7 extends downwardly through an opening in table 4, and is pivoted to the short arm of a treadle lever 9, said lever being pivoted to a lug 10 depending from the table frame 11. By pressing downwardly on the treadle 12, the plate 6 is caused to rise, and so to push the welded hub out of the matrix in electrode B.

I claim:

1. A welding electrode formed in sections secured together and having faces in the same plane, there being conjointly in said faces a matrix for receiving and positioning one of the objects to be welded.

2. A welding electrode formed in sections detachably secured together, there being conjointly in said sections a matrix for receiving and positioning one of the objects to be welded.

3. A welding electrode, comprising a support of conducting material, and secured thereon a plurality of separately removable plates; there being conjointly in said plates a matrix for receiving and positioning one of the objects to be welded.

4. A welding electrode, comprising a support of conducting material, having a recess in its face, and, seated in said recess, a plurality of separately removable plates; there being conjointly in said plates a matrix for receiving and positioning one of the objects to be welded.

5. A welding electrode, comprising a cylindrical support of conducting material, having an annular recess in its face, and, seated in said recess, a plurality of plates; there being conjointly in said plates a matrix for receiving and positioning one of the objects to be welded.

6. A welding electrode, having a matrix for receiving and positioning one of the objects to be welded, means for pressing said object into said matrix, and mechanism for moving said object out of said matrix.

7. A welding electrode, having a matrix for receiving and positioning one of the objects to be welded, and a central opening extending through said electrode, means for pressing said object into said matrix, a member disposed in said opening, and mechanism for moving said member to push said object out of said matrix.

8. A support, a welding electrode having a matrix for receiving one of the objects to be welded, and a central opening extending through said electrode, means for pressing said object into said matrix, a member disposed in said electrode opening and extending through said support, and a pivoted treadle lever pivoted to the said member for moving said member to push said object out of said matrix.

In testimony whereof I have affixed my signature in presence of two witnesses.

THOMAS E. MURRAY.

Witnesses:
GERTRUDE T. PORTER,
MAY T. McGARRY.